United States Patent
Hansen et al.

(10) Patent No.: US 10,387,374 B2
(45) Date of Patent: Aug. 20, 2019

(54) SCALABLE GRID DEDUPLICATION

(71) Applicants: Thomas G. Hansen, Bellingham, MA (US); Daniel P. Martinelli, Hopkinton, MA (US); Lucas H. Makosky, Harvard, MA (US); Mark B. Hecker, Northborough, MA (US); Stephen A. Smith, Bedford, NH (US); Adrian T. VanderSpek, Worcester, MA (US); David G. Therrien, Nashua, NH (US)

(72) Inventors: Thomas G. Hansen, Bellingham, MA (US); Daniel P. Martinelli, Hopkinton, MA (US); Lucas H. Makosky, Harvard, MA (US); Mark B. Hecker, Northborough, MA (US); Stephen A. Smith, Bedford, NH (US); Adrian T. VanderSpek, Worcester, MA (US); David G. Therrien, Nashua, NH (US)

(73) Assignee: Exagrid Systems, Inc., Marlborough, MA (US)

(*) Notice: Subject to any disclaimer, the term of this patent is extended or adjusted under 35 U.S.C. 154(b) by 708 days.

(21) Appl. No.: 14/633,366

(22) Filed: Feb. 27, 2015

(65) Prior Publication Data

US 2016/0253351 A1 Sep. 1, 2016

(51) Int. Cl.
*G06F 16/17* (2019.01)
*G06F 16/174* (2019.01)
(Continued)

(52) U.S. Cl.
CPC ...... *G06F 16/1744* (2019.01); *G06F 11/1453* (2013.01); *G06F 11/1464* (2013.01);
(Continued)

(58) Field of Classification Search
CPC ........... G06F 17/30153; G06F 11/1453; G06F 11/1464; G06F 17/30162; G06F 16/1744; H04L 67/1097
(Continued)

(56) References Cited

U.S. PATENT DOCUMENTS 5,574,906 A 11/1996 Morris
5,813,017 A 9/1998 Morris
(Continued)

FOREIGN PATENT DOCUMENTS

EP 0 774 720 A2 5/1997
EP 0 774 720 A3 5/1997
(Continued)

OTHER PUBLICATIONS

1997 Research Paper, *Efficient Distributed Backup with Delta Compression* (Randal C. Burns, Darrell D.E. Long), 11 pages.
(Continued)

*Primary Examiner* — Hicham Skhoun
(74) *Attorney, Agent, or Firm* — Mintz Levin Cohn Ferris Glovsky and Popeo, P.C.

(57) ABSTRACT

A system, a method, and a computer program product for performing deduplication of data using a scalable deduplication grid are disclosed. A listing of a plurality of zone stamps is generated, where each zone stamp represents a zone in the plurality of zones in a data stream. The listing contains a logical arrangement of the plurality of zone stamps obtained from each storage location and being accessible by a plurality of servers. A first zone stamp in the listing is compared to a second zone stamp in the listing. The first and second zones are delta-compressed based on a determination that the first zone stamp is substantially similar to the second zone stamp. A server is selected to perform the comparison and delta-compression.

45 Claims, 6 Drawing Sheets

(51) Int. Cl.
  *H04L 29/08* (2006.01)
  *G06F 11/14* (2006.01)
  *H04L 29/06* (2006.01)

(52) U.S. Cl.
  CPC ...... *G06F 16/1756* (2019.01); *H04L 67/1097* (2013.01); *H04L 69/04* (2013.01)

(58) Field of Classification Search
  USPC .......................................................... 707/692
  See application file for complete search history.

(56) References Cited

U.S. PATENT DOCUMENTS

| | | | |
|---|---|---|---|
| 7,539,745 B1 | 5/2009 | Wang et al. | |
| 7,562,186 B2 | 7/2009 | Li et al. | |
| 7,769,722 B1 | 8/2010 | Bergant et al. | |
| 7,962,520 B2 | 6/2011 | Patterson et al. | |
| 8,285,957 B1 | 10/2012 | Nag et al. | |
| 8,315,985 B1 | 11/2012 | Ohr et al. | |
| 8,412,848 B2 | 4/2013 | Therrien et al. | |
| 8,447,740 B1* | 5/2013 | Huang | G06F 17/30156 707/640 |
| 8,812,738 B2 | 8/2014 | Therrien et al. | |
| 8,898,120 B1 | 11/2014 | Efstathopoulos | |
| 8,972,672 B1 | 3/2015 | Wallace et al. | |
| 9,110,898 B1 | 8/2015 | Chamness et al. | |
| 9,286,313 B1 | 3/2016 | Sharangpani | |
| 9,384,205 B1 | 7/2016 | Gipp et al. | |
| 9,477,661 B1 | 10/2016 | Chamness et al. | |
| 2002/0073106 A1 | 6/2002 | Parker et al. | |
| 2007/0239945 A1 | 10/2007 | Li et al. | |
| 2008/0195677 A1 | 8/2008 | Sudhakar et al. | |
| 2009/0182789 A1 | 7/2009 | Sandorfi et al. | |
| 2010/0306412 A1 | 12/2010 | Therrien et al. | |
| 2011/0119240 A1 | 5/2011 | Shapira | |
| 2011/0273982 A1 | 11/2011 | Akirav et al. | |
| 2012/0137173 A1 | 5/2012 | Burshan et al. | |
| 2012/0150798 A1 | 6/2012 | Dawson et al. | |
| 2012/0303680 A1 | 11/2012 | McLennan et al. | |
| 2013/0024435 A1 | 1/2013 | Poirier et al. | |
| 2013/0066868 A1 | 3/2013 | Hecker et al. | |
| 2013/0290474 A1* | 10/2013 | Therrien | H03M 7/3084 709/216 |
| 2014/0052700 A1* | 2/2014 | VanderSpek | G06F 17/30162 707/693 |
| 2014/0089260 A1 | 3/2014 | Amrhein et al. | |
| 2014/0143219 A1* | 5/2014 | Therrien | G06F 17/30162 707/695 |
| 2014/0258655 A1 | 9/2014 | Park et al. | |
| 2014/0279956 A1 | 9/2014 | Trimble et al. | |
| 2015/0235038 A1* | 8/2015 | Inoue | G06F 17/30584 707/737 |
| 2015/0326481 A1 | 11/2015 | Rector | |
| 2016/0342618 A1 | 11/2016 | Watkins et al. | |
| 2017/0046360 A1 | 2/2017 | Therrien et al. | |
| 2017/0060696 A1 | 3/2017 | Wellnitz et al. | |

FOREIGN PATENT DOCUMENTS

| | | |
|---|---|---|
| EP | 0 774 720 B1 | 5/1997 |
| EP | 2698732 A1 | 8/2014 |
| EP | 3 062 227 A1 | 8/2016 |
| EP | 3 098 714 A1 | 11/2016 |
| WO | WO-01/52116 A1 | 7/2001 |
| WO | WO-01/52116 A8 | 7/2001 |

OTHER PUBLICATIONS

2000 Research Paper, *File System Support for Delta Compression* (Joshua P. MacDonald), 32 pages.

2002 Research Paper, *Cluster-based Delta Compression of a Collection of Files* (Zan Ouyang, Nasir Memon, Torsten Suel, Dimitre Trendafilov), 10 pages.

Extended European Search Report dated Nov. 22, 2013, for EP Application No. 13180747.1, filed Aug. 16, 2013, 5 pages.

Extended European Search Report dated Mar. 23, 2017, for EP Application No. EP16184063.2, filed on Aug. 12, 2016, 8 pages.

Anonymous (May 2, 2012). "Throttling process (computing)— Wikipedia," located at <https://en.wikipedia.org/wiki/Throttling_process_(computing)>, last visited Apr. 11, 2018, 1 page.

Bhagwat, D. et al. (Dec. 2009). "Extreme Binning: Scalable, Parallel Deduplication for Chunk-based File Backup," located at <http://ieeexplore.ieee.org/stamp/stamp.jsp?tp=&arnumber=5366623> 9 pages.

Extended European Search Report dated Feb. 23, 2017 for EP Patent Application No. 16184062.4, 7 pages.

Microsoft, "Edit Replication Schedules and Bandwidth," (Oct. 2013), located at <https://docs.microsoft.com/en-us/previous-versions/windows/it-pro/windows-server-2008-R2-and-2008/cc732278(v=ws.11)> last visited Feb. 20, 2018, 2 pages.

Extended European Search Report for Application No. EP 16 15 7662 dated Aug. 2, 2016.

\* cited by examiner

SCALABLE GRID DEDUPLICATION

TECHNICAL FIELD

In some implementations, the current subject matter relates to data processing, and in particular, to a scalable server grid system for deduplication of data.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup application employ a plurality of techniques to manage data designated for backup. One such technique includes deduplication. Deduplication can be used to eliminate redundancy in the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

Deduplication involves identifying similar or identical patterns of bytes within a data stream, and replacing those bytes with fewer representative bytes. By doing so, deduplicated data consumes less disk storage capacity than data that has not been deduplicated and when the data stream must be transmitted between two geographically separate locations, consumes less network bandwidth. Adaptive deduplication strategies combine inter-file and/or intra-file discovery techniques to achieve the aforementioned goals.

Deduplication can be used to reduce the amount of primary storage capacity that is consumed by email systems, databases and files within file systems. It can also be used to reduce the amount of secondary storage capacity consumed by backup, archiving, hierarchical storage management (HSM), document management, records management and continuous data protection applications. In addition, it can be used to support disaster recovery systems which provide secondary storage at two or more geographically dispersed facilities to protect from the total loss of data when one site becomes unavailable due to a site disaster or local system failure. In such a case, deduplication helps to reduce not only the amount of data storage consumed, but also the amount of network bandwidth required to transmit data between two or more facilities.

Conventional deduplication-based data storage systems perform site-wide deduplication by using a single compute server that is responsible for deduplicating all data stored on one or more simple disk storage units that have no deduplication processing capability. However, these deduplication systems typically suffer from availability issues, where failure/loss of a single compute server can render all data stored on the simple disk units inaccessible to the users and/or other systems. As the amount of backup data increases, additional disk storage units are added, but since they cannot assist in deduplication processing, the end-to-end backup time of these systems increases to the point where it exceeds the backup window limits of the IT department's service level agreement.

Thus, there is a need for a deduplication server grid system, where each grid server can include not only an additional disk storage capacity, but also one or more processing units, memory capacity, and networking ports to perform deduplication.

SUMMARY

In some implementations, the current subject matter relates to a computer-implemented method for performing deduplication of data using scalable server grid system discussed above, according to some implementations of the current subject matter. The method can include generating a listing of a plurality of zone stamps, each zone stamp representing a zone in the plurality of zones in a data stream, the generated listing containing a logical arrangement of the plurality of zone stamps obtained from each storage location and being accessible by a plurality of servers; comparing a first zone stamp in the plurality of zone stamps contained in the generated listing to a second zone stamp in the plurality of zone stamps contained in the generated listing, the first zone stamp representing a first zone in the plurality of zones and the second zone stamp representing a second zone in the plurality of zones; delta-compressing the first zone and the second zone based on a determination that the first zone stamp is substantially similar to the second zone stamp; and selecting, based on the generated listing, a server in the plurality of servers to perform the comparing and the delta-compressing.

In some implementations, the current subject matter can include one or more of the following optional features. The method can further include deleting at least one of the first zone stamp and the second zone stamp from the generated listing. The deleted zone stamps can represent at least one zone purged from the plurality of zones. Additionally, the zone stamps associated with zones that were delta-compressed (which are not now and never will be anchors) can be purged form the stamp table. Purging these entries from the stamp table can help accelerate future stamp matches.

In some implementations, the logical arrangement of the plurality of zone stamps can be based on at least one of the following: a processing capability of each server in the plurality of servers, a size of each zone in the plurality of zones, a time consumed by the comparing, and availability of each server in the plurality of servers.

In some implementations, the comparing can include comparing the first zone stamp and the second zone stamp based on the first zone and the second zone having at least one of the following: same starting characters and same ending characters.

In some implementations, the delta-compressing can include delta-compressing the first zone and the second zone at at least one of the following: a first server in the plurality of servers storing the first zone and a second server in the plurality of servers storing the second zone. The delta-compressing can also include determining that a portion of the first zone is stored on a first server in the plurality of servers and another portion of the first zone is stored on a second server in the plurality of servers; and delta-compressing the first zone using the first server or the second server.

In some implementations, the selecting can include determining that a portion of the first zone is stored on a first server in the plurality of servers and another portion of the first zone is stored on a second server in the plurality of servers; and selecting the first server or the second server to perform the comparing and the delta-compressing.

In some implementations, the method can also include storing a delta-compressed zone at a server in a plurality of servers that received the un-delta-compressed zone in the data stream. Additionally, the method can include deduplicating, based on delta-compressing, the first zone and the second zone.

In some implementations, each delta-compressed zone can be associated with an anchor, wherein a plurality of delta-compressed zones can be dependent on the anchor, the delta-compressed zone is stored at a server in the plurality of servers storing the anchor. The selecting can include selecting a server in the plurality of servers to perform the comparing and the delta-compressing, where the selected server can store the anchor.

In some implementations, the method can further include removing a zone stamp from the generated listing, wherein the zone stamp represents an anchor delta-compressed zone having at least one dependent delta-compressed zone. Further, the method can include performing at least one of the comparing, the delta-compressing, and the selecting by the plurality of servers in parallel.

In some implementations, each zone can have a fixed and/or variable length.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
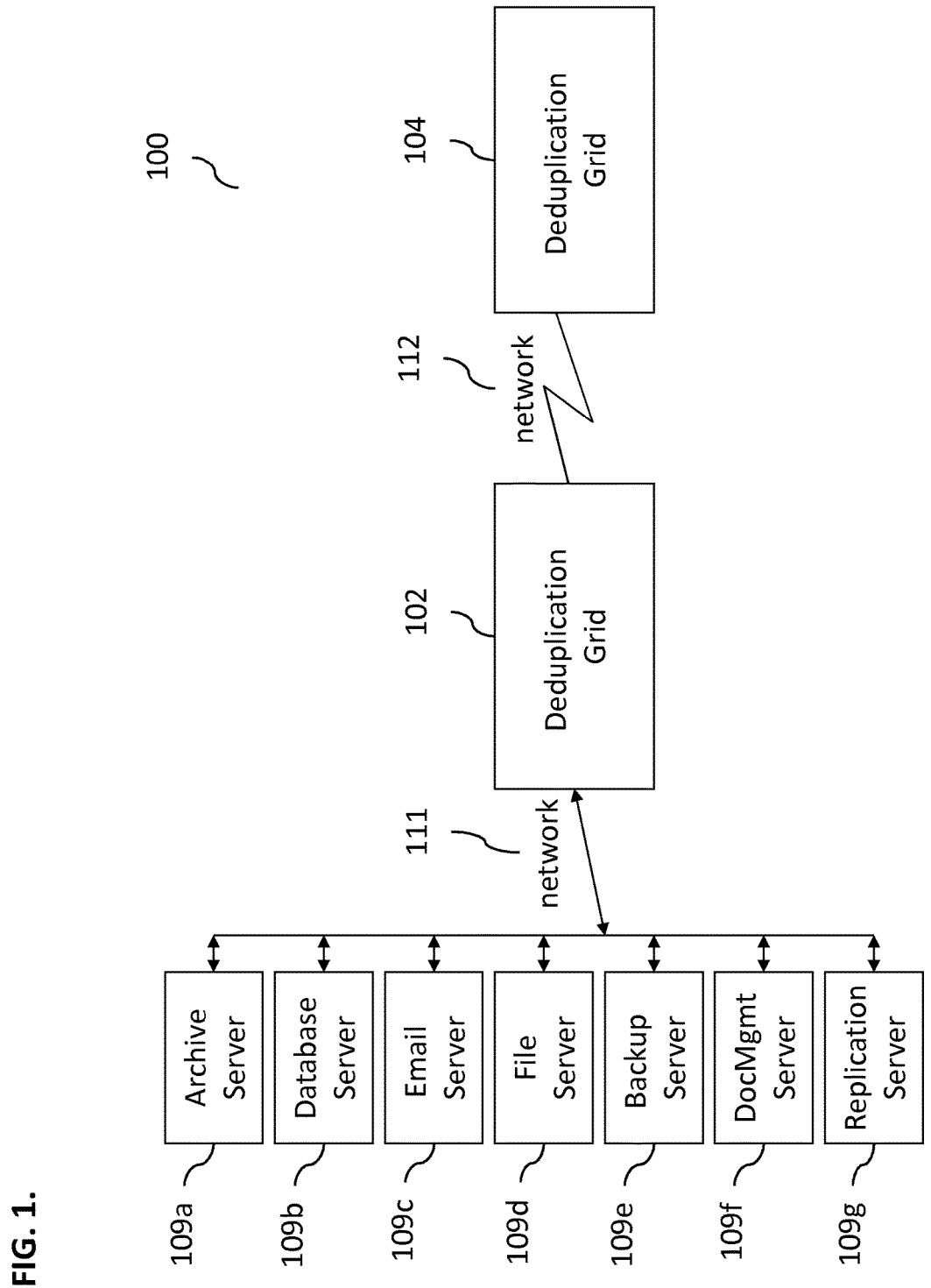
FIG. 1 illustrates an exemplary data deduplication system for deduplicating a stream of data received from a variety of sources, according to some implementations of the current subject matter.

To address these and potentially other deficiencies of currently available solutions, one or more implementations of the current subject matter provide methods, systems, articles or manufacture, and the like that can, among other possible advantages, provide for a deduplication of data using a scalable server grid system.

In some implementations, the current subject matter can perform processing of one or more streams of data (e.g., backup streams of data or any other data streams). The data stream can include a plurality data zones and each zone can be associated with a zone stamp that can identify that zone. The current subject matter can generate such zones and zone stamps based on the analysis of the received data steam(s). The zone stamps can be compared to one another (whether or not the zones are within the same data stream or not).

Deduplication can reduce data storage capacity consumption and/or inter-site network bandwidth requirements. Further, data deduplication can reduce an amount of data storage capacity that can be consumed by primary, backup, archive, etc. data storage systems. Further, deduplication can be effective in eliminating redundant data from being transferred across cost and/or bandwidth limited inter-site networks. Deduplication methods can be executed within and/or among a logical collection of internetworked compute and/or data storage servers, which can be referred to as grid servers. Grid servers can receive incoming stream(s) of data for deduplication, store data locally, and/or optionally replicate and store remotely for some period of time. From this incoming data, zones can be created. Zones can be contiguous and/or non-contiguous segments of the incoming data, e.g., entire files, an aggregation of multiple files, etc. For each zone in a data stream, a zone stamp can be generated and/or computed based on a content of the zone's data bytes.

A zone stamp can be a string containing up to 64 characters (and/or any other number of characters), which, in some exemplary implementations, can be smaller than or equal to the size of the zone it represents. Because of the smaller size of zone stamps, the entire list of zone stamps can be stored in a main memory (e.g., a high-speed memory location) to allow them to be quickly and/or efficiently compared to each other in order to identify zones whose content is similar and/or identical and/or substantially identical to one another. Such zones of data can then be delta compressed against each other so that the zones can be replaced by one unaltered zone and another delta compressed zone that can contain just the bytes that are different between the zones.

In some implementations, the current subject matter relates to a deduplication grid server network that can perform deduplication of data. The grid server network can include a plurality of grid servers or nodes that are communicatively coupled to one another, where each grid server can include disk storage capacity, processing units, memory capacity, and/or networking ports for performing deduplication methods. The servers can be communicatively coupled using any type of network (e.g., wide area network ("WAN"), local area network ("LAN"), metropolitan area network ("MAN"), internet, extranet, intranet, and/or any other type of wireless and/or wired network).

Using the grid server architecture, each grid server can execute grid deduplication methods on data that can be stored within its own server. This process can be performed by the grid server independently and/or in parallel with other grid servers in the grid server network. Further, since grid servers can be interconnected via the grid server network, they can cooperate and/or communicate with one another to perform deduplication of data across all grid servers in the deduplication grid server network. This grid deduplication activity within and among multiple grid servers can provide scalable performance that can be commensurate with storage capacity growth.

Additionally, a loss of any grid server(s) within the network may affect the availability of the zones that it is responsible for storing, however, the current subject matter's grid server network can provide for failover/recovery models, whereby each grid server in the network can be a peer within the grid server network and any services can be relocated from the failed grid server to the remaining operational grid servers.

FIG. 1 illustrates an exemplary data deduplication system 100 for deduplicating a stream of data received from a variety of sources 109 (*a, b, c, d, e, f, g*). The source 109 can include an archive server 109*a*, a database server 109*b*, an email server 109*c*, a file server 109*d*, a backup server 109*e*, a document management server 109*f*, a replication server 109*g*, as well as any other application, business object, business process, business process application, server, software, hardware, etc. The system 100 can further include a deduplication grids 102, 104 and networks 111, 112. The network 111 can communicatively couple the deduplication grid 102 and source 109 and the network 112 can communicatively couple the deduplication grid 102 and the deduplication grid 104. In some implementations, the deduplication grid 102 can be located in the same physical location as the sources 109. Alternatively, the grid 102 can be remote from the sources 109. The grid 104 can be remotely located from the sources 109 and/or grid 102. For example, the grid 104 can be a backup site for the data received from the source 109.

The grids 102 and/or 104 can include one or more computing devices, systems, servers, hardware, software, and/or any combination of hardware and/or software, which can be communicatively coupled with one another using various wireless and/or wired connections, networks, etc. The networks 111, 112 can be any wireless and/or wired networks, WAN, MAN, LAN, Internet, extranet, intranet, as well any other type of network.

In some embodiments, the deduplication grid 102 can receive data stream(s) from sources 109 and can perform an initial deduplication of the received data. Additionally, the grid 102 can also perform reconstituting original un-deduplicated data, when requested to do so by source(s) 109. The deduplicated data can be stored in a storage local to the grid 102 (not shown in FIG. 1). The deduplicated data can be sent to grid 104 and stored in a storage local to the grid 104 (not shown in FIG. 1). For example, critical application data can be stored at a local facility (e.g., as represented by the grid 102) and at a geographically distant remote facility (e.g., as represented by the grid 104) in order to provide for a full recovery in the event of system failure, site disaster, or any other unprecedented condition or event.

Figure 2:
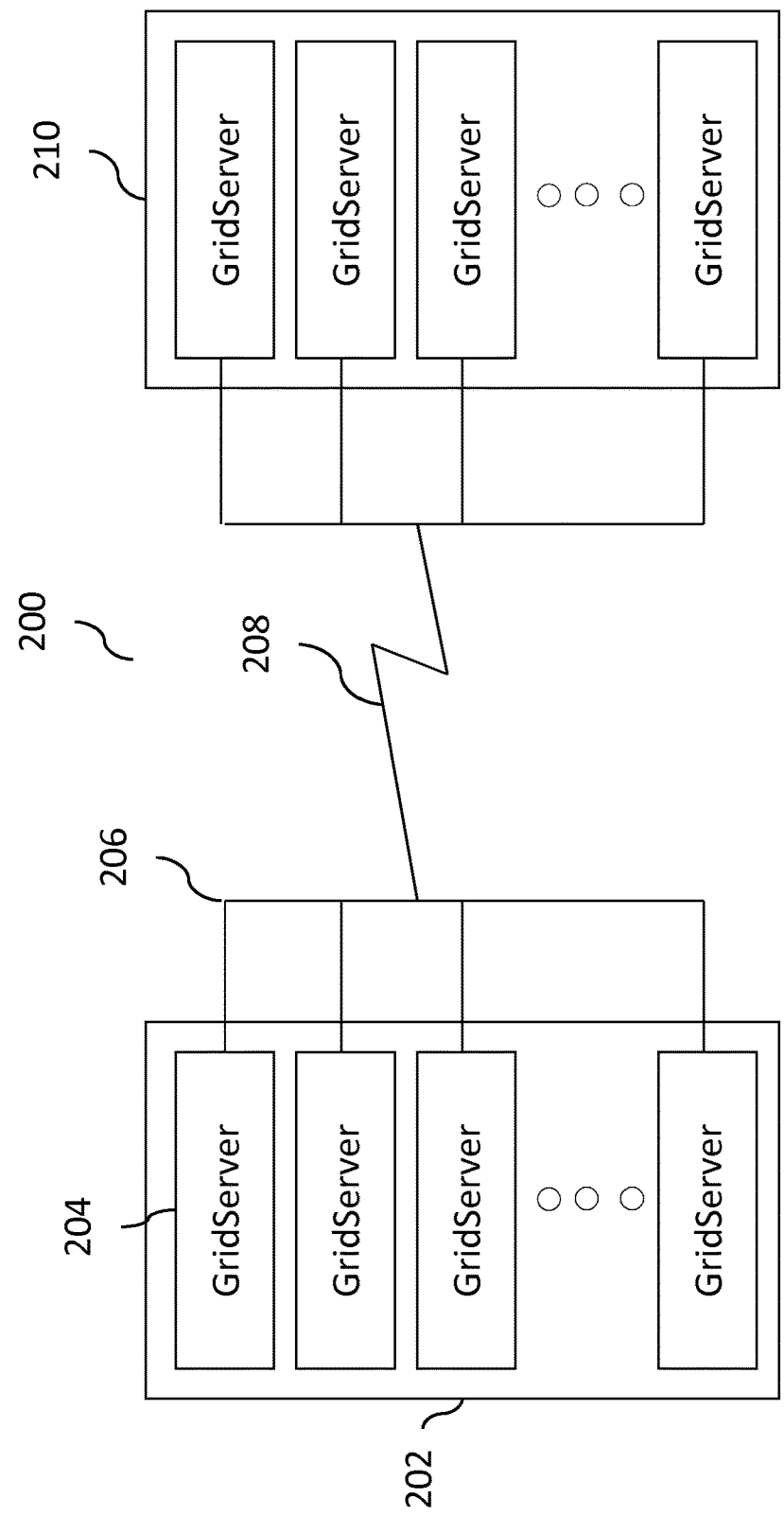
FIG. 2 illustrates an exemplary network, according to some implementations of the current subject matter.

FIG. 2 illustrates an exemplary network 200, according to some implementations of the current subject matter. The network 200 can include a plurality of network sites 202 and 210 are shown in FIG. 2), each having a deduplication grid containing a plurality of deduplication grid servers 204. The grid servers 204 within each site 202 and 210 can be communicatively coupled using any wireless and/or wired networks, WAN, MAN, LAN, Internet, extranet, intranet, as well any other type of network 206. The sites 202 and 210 can be communicatively coupled using any wireless and/or wired networks, WAN, MAN, LAN, Internet, extranet, intranet, as well any other type of network 208.

In some implementations, the current subject matter can provide a multi-stage and/or multi-level deduplication of streams of data, which can be received by one or more servers in the network 200. In some implementations, the data stream that can be received can be split into a plurality of zones that can be matched against one another in order to determine whether or not zones are similar to one another, identical, and/or substantially similar (e.g., zones that include similar data content). Zones having similar, identical, and/or substantially similar data content can be deduplicated using delta compression and/or data compression. Other zones that are not similar, identical, and/or substantially similar to any other zone in the received data stream can be further processed using data compression. These size-reduced zones can then be transmitted across network 200, which can save network bandwidth and accelerate the time it can take to replicate all of the zones.

In some implementations, the current subject matter can perform multiple sequential operations during processing of backup data stream(s) into deduplicated and/or replicated zones. The operations can include at least one of the following: backup stream splitting, stamp creation, stamp redistribution, stamp matching, grid delta compression, rebalancing, purging, and/or any other operations and/or any combination thereof. The zones can be purged from the server grid when they are no longer required to be accessed by any of these applications 109. In some implementations, stream splitting, stamp creation, stamp matching, grid delta compression, rebalancing, and/or purging can be performed asynchronously to one another. This can be done to maximize utilization of system resources. The following is a discussion of each of these processes and how such processes can be performed by each grid server in the grid independently while other processes are performed across other servers.

In some implementations, the current subject matter system can perform data stream (e.g., backup stream) splitting and/or stamp creation in accordance with an exemplary process described in U.S. Pat. No. 8,412,848 to Therrien et al., issued Apr. 2, 2013, which is incorporated herein by reference in its entirety. In some implementations, each grid server in the grid server network can perform data stream splitting independent and form zones based on the received data as well as create zone stamps for each formed zones. Each grid server can receive a data stream that can be specifically destined for that particular server and/or, alternatively, grid servers can receive one data stream that can be destined for the network and determine how to split the data stream for further processing by each grid server. A separate stamp table can be created for each network attached storage ("NAS") share located within each grid server. These NAS-specific stamp tables can be sorted from smallest to largest zone size in order to accelerate downstream stamp matching process. During stamp matching, zone stamps whose zone sizes are +/−P percent different in size can be considered for matching in order to accelerate the stamp matching process.

Figure 3:
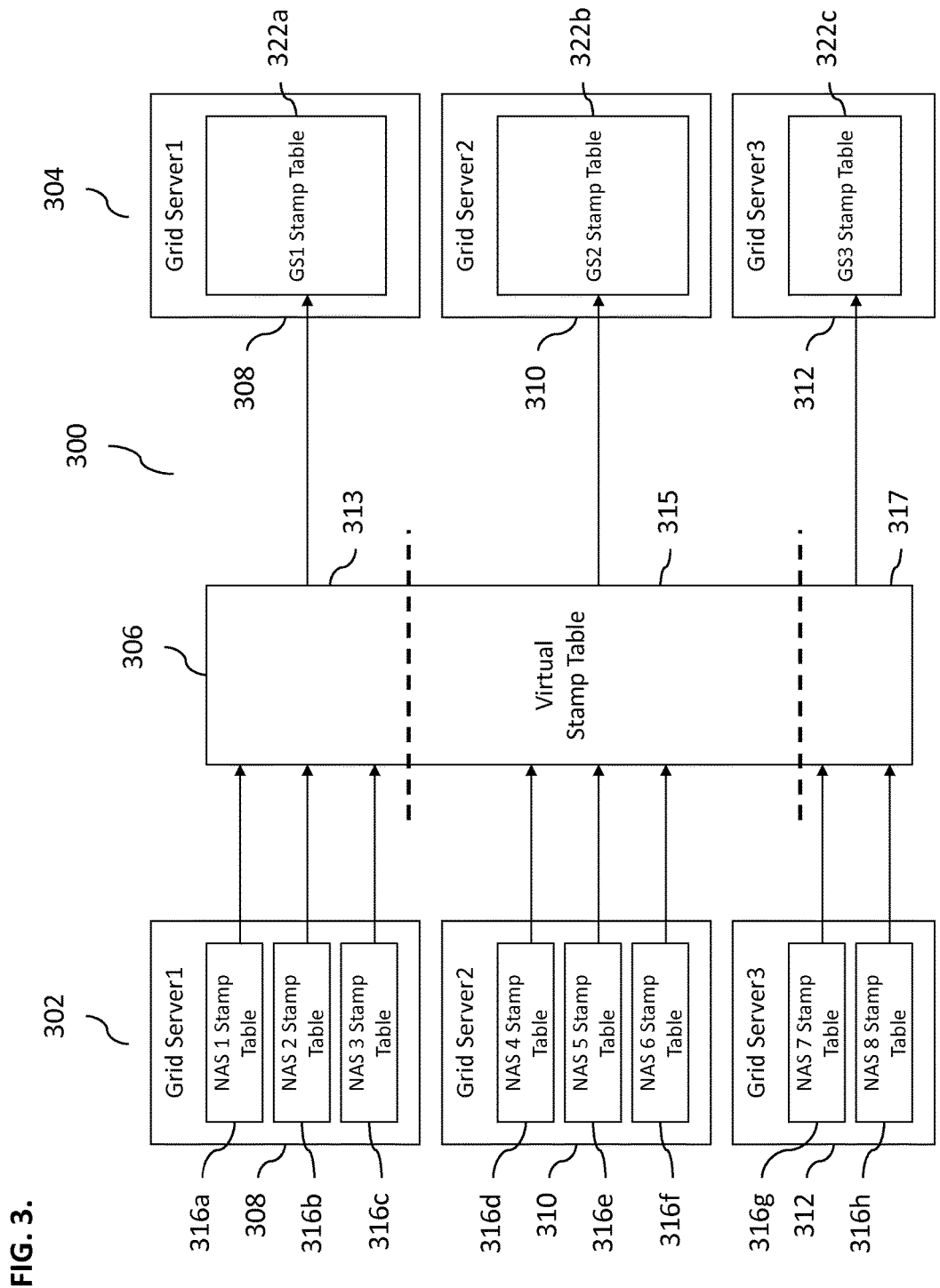
FIG. 3 illustrates an exemplary system for performing stamp re-distribution, according to some implementations of the current subject matter.

FIG. 3 illustrates an exemplary system 300 for performing stamp re-distribution, according to some implementations of the current subject matter. The system 300 can join a plurality of NAS shares dependent and grid server dependent stamp tables into a single "logical" or virtual grid-wide stamp table to perform stamp matching of zones that may match among multiple NAS shares and/or grid servers. As shown in FIG. 3, the system 300 can include a server grid network 302 that can include a grid server 1 308, a grid server 2, 310, and a grid server 3, 312. Each grid server 308-312 can include its respective NAS shares. For example, grid server 1 can include NAS shares 1-3, grid server 2 can include NAS shares 4-6, and grid server 3 can include NAS shares 7-8. Each NAS share can be associated with its own stamp table 316 (a, b, c, d, e, f, g, h). For example, NAS share 1 can be associated with a stamp table 316a, NAS share 2 can be associated with a stamp table 316b, etc. The stamp tables 316 can be stored on respective grid servers 1-3 based on where the corresponding NAS shares are stored.

The stamp tables 316 can be combined together to form a virtual table 306 that can be used by the grid servers 308-312 for the purposes of stamp matching. Without such virtual table 306, each grid server would maintain their own isolated stamp table and during stamp matching, only zones form the same NAS share on the same grid server would be considered for stamp matching. The stamp table 306 can allow for a more effective way of performing stamp matching. In some implementations, the stamp table 306 can be sorted based on a variety of factors, which can include at least one of the following: sizes of zones associated with zone stamps contained in the table 306, location of these zones, grid server processing speed, grid server load, as well as other factors.

For the purposes of illustration of operation of the system 300, it is assumed that all independent grid server NAS stamp tables can be merged into a single logical stamp table 306 and that the table 306 can be sorted based on a size of the zones stored in the grid servers from the smallest zone size to the largest zone size, regardless of which grid server it came from. The table 306 can be partitioned in accordance with specific sizes. As shown in FIG. 3, the table 305 can include three partitions 313, 315, and 317. As can be understood, the table 306 can be partitioned into any number of partitions. The number of partitions can be dependent on the number of grid servers in the grid network, processing power of each grid server, processing capability of each grid server, memory capability of each server, zone sizes to be processed by the grid server, and/or any other factors, and/or any combination thereof.

Once the stamp table 306 is partitioned into partitions 313, 315, and 317, the partitions are redistributed to the grid servers 308-312. As shown in FIG. 3, the partition 313 can be provided to the grid server 308 and can become a grid server 1 stamp table 322a; the partition 315 can be provided to the grid server 310 and can become a grid server 2 stamp table 322b; and the partition 317 can be provided to the grid server 312 and can become a grid server 3 stamp table 322c. The stamp table entries can be redistributed by merging zone stamps for zones that may need to be moved to other grid server(s) into an updated and/or sorted stamp table in that grid server.

In some implementations, the redistribution of the table 306 can be based on at least one of the following criteria. In the system 300, each grid server 308-312 can have different processing capabilities (e.g., central processing unit ("CPU") speed, number of CPU cores, memory size, etc.). The table 306 can be subdivided among grid servers 308-312 based on a relative processing power that can be available at each grid server. For example, in the three grid server network 300 shown in FIG. 3, grid server 1 can have twice the processing power and/or main memory capacity of the grid servers 2 and 3. Thus, the stamp matching distribution by zone size can be as shown in Table 1 below.

TABLE 1

Exemplary virtual stamp table.

| Grid Server | Zone Size | Number of Zones |
|---|---|---|
| 1 | 2 MB to ≤10 MB | 2M |
| 2 | >10 MB to ≤11 MB | 1M |
| 3 | >11 MB to 100 MB | 1M |

As shown in Table 1, grid server 1 is capable of processing zones having sizes of 2 megabytes ("MB") to less than or equal to 10 MB and since, it has two times the processing capability of the other grid servers, it is capable of processing 2 million zones having this particular size. The grid server 2 can be assigned to process zones having sizes of greater than 10 MB to less than or equal to 11 MB and grid server 3 can be assigned to process zones having sizes of greater than 11 MB to 100 MB. As shown in Table 1, grid servers 2 and 3 can be assigned to process 1 million zones each.

In some implementations, the redistribution of the stamp table 306 to grid servers 308-312 can be made based on overlapping ranges of stamp entries for increased stamp matching availability in the event of a temporary and/or permanent grid server failure. In some implementations, the zone stamps in the stamp table 306 can be evenly distributed in the stamp table 306 and among grid servers 308-312. The current subject matter system 300 can also monitor the time that it takes to complete stamp matching process each time stamp matching is performed. Based on the monitoring, the system 300 can periodically re-distribute load across the grid servers 308-312 to allow the grid servers to complete stamp matching in approximately the same amount of time. Alternatively, each grid server can be associated with a particular time period within which it is to complete its stamp matching. If the grid server fails to complete the stamp matching within that period of time, the system 300 can perform an appropriate rebalancing. If the grid server completes stamp matching sooner than the expiration of the time period, the system 300 can also perform rebalancing. This can ensure that grid servers are fully utilized and are not overburdened. The distribution of zone stamps to each grid server can be dynamic and can be rebalanced when existing grid servers become unavailable and/or new grid servers are introduced into the deduplication grid.

In some implementations, a grid server can be selected as a coordinator that can determine how to distribute zone stamps among other grid servers for processing. The coordinator grid server can coordinate distribution of zone stamps based on the table 306 and can perform monitoring of the stamp matching process by receiving reports from the gird servers performing the stamp matching. The coordinator grid server can query the grid servers for such reports and/or can receive them automatically. The coordinator grid server can also perform stamp matching.

In some implementations, recently defined/updated zone sizes can act as split points in the stamp table 306. As each new zone stamp is created during data stream splitting and stamp matching, the zone stamp can be placed on a stamp redirection queue in order to be redirected to the grid server that is currently assigned to perform stamp matching for all zones of that size. Within the selected grid server, an asynchronous stamp matching can be performed, which can compare new zone stamp against all other zone stamps that are maintained in the grid server's stamp table. Asynchronously, a stamp match response can be returned to the new stamp queue on the grid server that originally created the new zone stamp.

Figure 4:
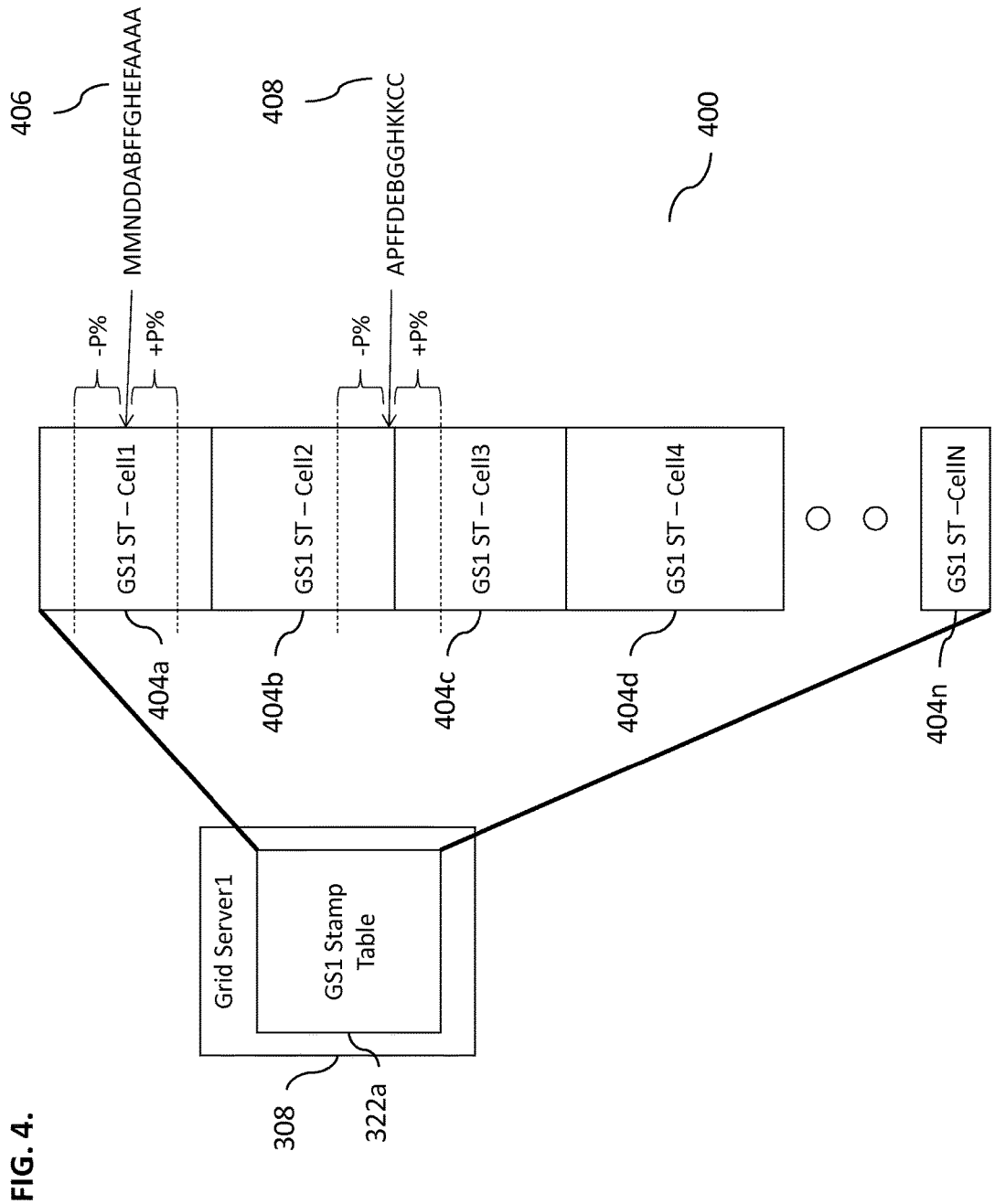
FIG. 4 illustrates an exemplary system for performing zone stamp redistribution, according to some implementations of the current subject matter.

FIG. 4 illustrates an exemplary system 400 for performing zone stamp redistribution, according to some implementations of the current subject matter. The system 400 includes a grid server 308 (as shown in FIG. 3) that includes a grid server 1 stamp table 322*a*. The stamp table 322*a* has been redistributed to the grid server 1 as part of the stamp redistribution process shown in FIG. 3.

The stamp table 322*a* can be subdivided into one or more sequentially contiguous logical "cells" 1, 2, . . . , N 404 (a, b, . . . n, where n is an integer). All grid server stamp table read operations during stamp matching and write operations during new stamp insertions require that the stamp table be locked. By splitting the stamp table 322*a* into contiguous cells 404, concurrent reading and writing can be performed among all cells, thereby improving overall new stamp insertion and/or stamp matching performance. In addition, each insertion of a new zone stamp into the stamp table 322*a* can be performed so that the stamp table 322*a* can remain sorted by zone size. By having cells 404 that can be smaller than the stamp table 322*a*, and thus, the table 306 (not shown in FIG. 3), the insertion of new zone stamps into cell 404 can be faster than inserting a new zone stamp into a single unified stamp table 306. When stamp matching is performed, one or more cells 404 can be involved with stamp matching within the region of +/−P % of zone sizes. For example, while cell 1 404*a* can have a zone with a zone stamp 406 contained within the cell 1, cell 2 404*b* and cell 3 404*c* can share a zone having a zone stamp 408 that is split across these cells.

Once the zone stamps are created and redistributed among grid servers, a stamp matching process can be performed. An exemplary process described in U.S. Pat. No. 8,412,848 to Therrien et al., issued Apr. 2, 2013, which is incorporated herein by reference in its entirety. In some implementations, zone stamps can have a variable length, e.g., from 3 to 64 characters. An exemplary zone stamp can include characters "A-P" with only 4 instances of each letter being used. For example, zone stamps AEFGAAAH, PAABNEFNAAH, PAADNEFNNAA can be typical examples of zone stamps. Stamp matching can leverage the following features that can ensure a downstream delta-compression operation can generate small delta files. Stamp matching should only be performed on pairs of zones that are close in size to each other (for example, zones that are within +/−P percent of zone size). Extending the range of stamps beyond P can increase stamp matching processing times and yield only small improvements in the overall deduplication ratio. As a processing accelerator, only pairs of zones that had the same X starting and/or Y ending characters can be compared with each other. This can produce a good yield of matching zones while greatly accelerating the stamp matching process. Since new zone stamps may need to be compared with existing zone stamps that are +/−P percent of zone size in size, the stamp matching can be performed on a single grid server for the zone stamps to be matched.

Referring to FIG. 4, a new zone stamp 404 can be compared with a range of stamps across a single cell 404 in the grid server stamp table 322*a* since the range of +/−P percent of zone size can be contained in a single cell. Cell 404*a* can be locked and a single thread can execute a search operation, and once complete, the cell can be unlocked. Zone stamp 408 can be compared with a range of stamps across a multiple cells 404 in the grid server stamp table 322*a* since the range of +/−P percent of the zone size spans two cells, i.e., cell 404*b* and 404*c*. Thus, cells 404*b* and 404*c* can be locked. Two threads can execute a search operation and when either thread responds with a match, the search operation can be terminated and both cells can be unlocked. When a search spans two or more cells 404, there is an acceleration benefit by having multiple CPU cores working on the stamp match simultaneously.

In a similar manner, stamp matching may have to take place across two logically adjacent grid servers when the size of a new zone is close to the grid server level split points 308, 309 since +P % or −P % of zone size may extend onto the stamp table of the next grid server. In this case, one or more cells within each affected grid server's stamp table will be locked, threads will execute that search operation, and when any thread responds with a match, the search operation is terminated and all cells that were locked for this operation will be unlocked. When a search spans two or more grid servers, there is an acceleration benefit by having multiple CPU cores in separate grid servers working on the stamp match simultaneously. In some implementations, stamp redistribution process can redistribute stamps across adjacent grid servers and/or replicate a percentage of "boundary" zone stamps (e.g., zone stamp 408) to multiple logically adjacent grid servers.

Upon completion of the stamp matching, a grid delta-compression process can be performed. If a zone stamp match was found by any of the grid servers, the two zones, whose zone stamps matched and/or can be substantially similar to one another, can be delta compressed together. Based on matching zone stamps and their related zones, the actual zones to be delta compressed can be located within the same grid server and/or different grid servers. When the zones are located on the same grid server, a local delta compression operation can be performed and the new delta-compressed patch file can be created and added to a version cluster that can include an anchor zone and a plurality of dependent delta-compressed versions dependent on the anchor. If the zones to be delta-compressed are located on different grid servers, the delta-compression operation can be performed on the grid server containing the new zone. This can be accomplished by moving the matching anchor zone to that grid server and performing the delta compression operation on that grid server.

In some implementations, the storage location of each anchor zone and/or delta-compressed zone can be independent of where its zone stamp was redistributed to for grid-level stamp matching. Zone stamps can be redistributed to load-balance the stamp matching process across all grid servers and to allow zones from all NAS shares and all grid servers to have an opportunity to be zone stamp matched with zones from any other NAS share on any other grid server. The location of anchor zones and their associated delta-compressed zones can be based on at least one of the following factors subject to storage space availability on a particular grid server. In some implementations, delta-compressed zones can be stored on the same grid server that received the data stream that the delta-compressed zone originated from. Alternatively, delta-compressed zones can be stored with their associated anchors. Further, anchor zones can be stored on a grid server that has the most delta-compressed zones that are associated with it.

Within the deduplication grid 202 (as shown in FIG. 2), each grid server 204 can execute various operations that can be asynchronous to operations that can be executed by other grid servers 204. For example, assuming there are separate data streams that are simultaneously being received by two different grid servers 204, in some implementations, it is possible for each grid server 204 to analyze its own data stream and concurrently find a zone that can have the same stamp and/or can have the same and/or similar zone size. These two stamps can be sent to the grid server that is currently responsible for performing stamp matching for zones of that size. The first of these zone stamps to arrive at the stamp matching grid server, can be compared to existing zone stamps to determine whether the zone stamp matches any of the existing zone stamps. If the first zone stamp does not match any of the existing zone stamps, the first zone stamp can be associated with an indication of a "new" zone, which can become an anchor zone. This zone can be directed to one of the grid servers based on the redistribution factors discussed above. When the second of these matching zone stamps arrives at the same grid server for stamp matching purposes, a determination can be made that there is a match with the recently created first zone stamp. Thus, the zone corresponding to the second zone stamp can be directed to the same grid server as the zone corresponding to the first zone stamp for delta-compression purposes. The zones can be delta-compressed against the anchor zone that has been previously created. The stamp matching process can be performed as a single-threaded point of synchronization to ensure that these zone stamps can be processed sequentially to allow one zone to be deemed the anchor and the other zone to be deemed the delta-compressed zone based on that anchor. The stamp matching process can serialize zone stamp matching requests for the same zone stamp and determine which grid server to move the new anchor zone and the new delta-compressed zone.

In some implementations, it can be possible for the zone associated with the second stamp to arrive at the destination grid server before the zone associated with the first stamp arrives. In an attempt to perform a delta-compression of the second zone against the first zone, the delta compression process can determine that the anchor to have this second zone delta compressed against has not arrived at this grid server. This can occur for any number of reasons: the source grid server is running slowly, or has failed or shut down, etc. The grid server that received the second zone can query all of the other grid servers to locate the first zone and wait until that first zone arrives at the destination grid server where it can take on a role of an anchor to its local delta-compressed zones.

In some implementations, the current subject matter system can perform rebalancing of the delta-compressed zones stored on each grid server. The rebalancing can depend on a particular anchor zone. The rebalancing can be performed to maximize colocation of each anchor zone with its delta-compressed zone(s) while balancing disk storage consumption across all grid servers.

In some implementations, the current subject matter system can also perform purging of zones based on a particular data retention policy. In particular, applications 109*a-g* (shown in FIG. 1) can be configured to maintain their data based on a policy-defined retention window. The retention window can reflect how long the data that has been sent to the deduplication grid 102 must be retained by the deduplication grid. For example, a 90-day retention window for one application's policy can have the application requesting that all data related to that application policy that is older than 90 days may be purged. Retention periods can range from units of minutes to years. For all data that exists in the deduplication grid that is being retained for longer than the retention period, one or more delete or purge requests can be issued by the application server to the deduplication grid. The deduplication grid can remove all files that are beyond the retention period specified in order to free up storage space for future incoming data streams. Every zone to be purged can be scheduled by the deduplication grid to be deleted. In addition, the stamp associated with each zone to be purged can also be deleted from the global stamp table.

Figure 5:
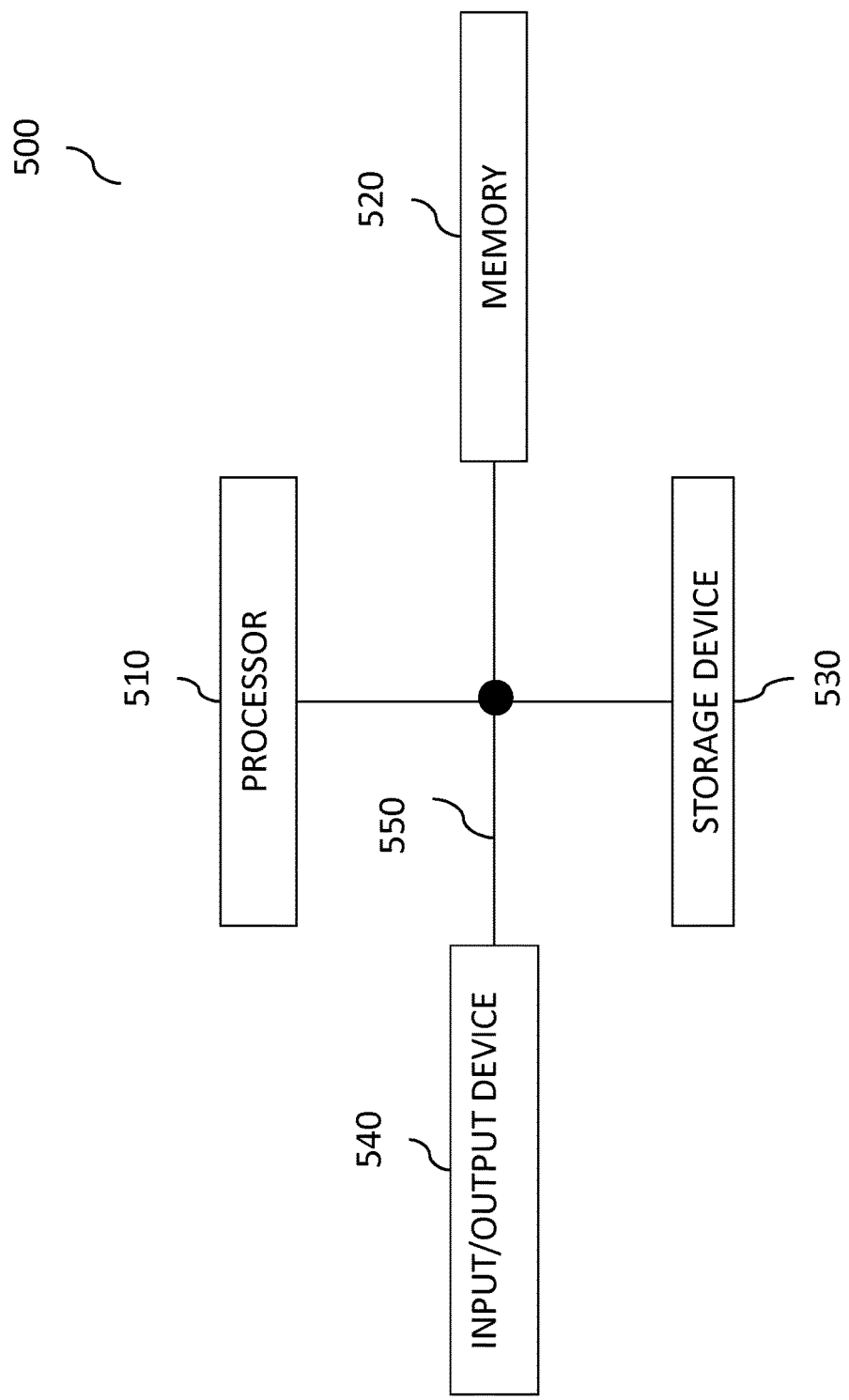
FIG. 5 illustrates an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
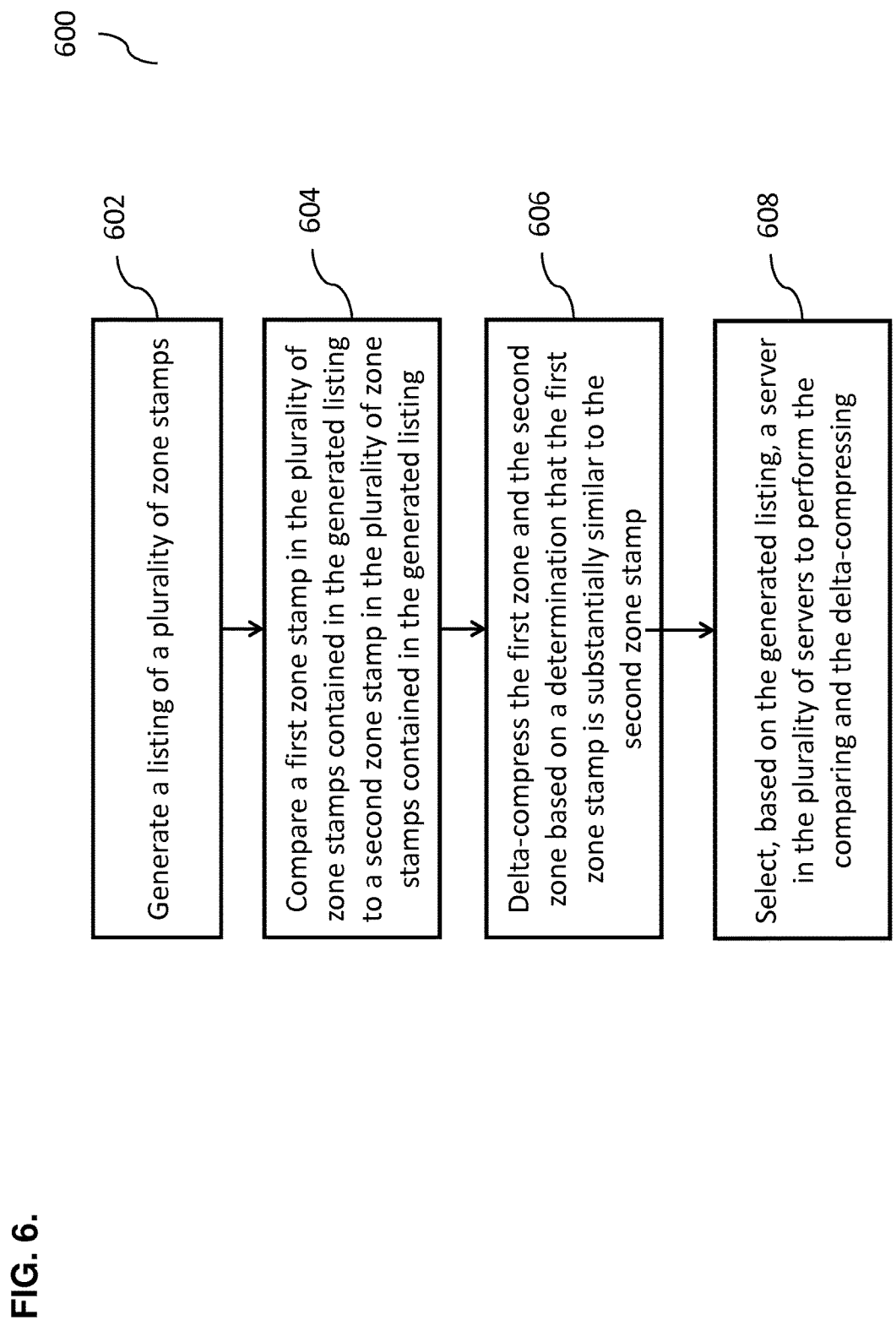
FIG. 6 illustrates an exemplary method, according to some implementations of the current subject matter.

FIG. 6 illustrates an exemplary method 600 for performing deduplication of data using scalable server grid system discussed above, according to some implementations of the current subject matter. At 602, a listing of a plurality of zone stamps can be generated. The listing can be similar to table 306 shown in FIG. 3. In the listing, each zone stamp can represent a zone in the plurality of zones in a data stream. The generated listing can contain a logical arrangement of the plurality of zone stamps obtained from each storage location and being accessible by a plurality of servers. The servers can be grid servers that form a scalable deduplication grid.

At 604, a first zone stamp in the plurality of zone stamps contained in the generated listing can be compared to a second zone stamp in the plurality of zone stamps contained in the generated listing. The first zone stamp can represent a first zone in the plurality of zones. The second zone stamp can represent a second zone in the plurality of zones. At 606, the first zone and the second zone can be delta-compressed together based on a determination that the first zone stamp is substantially similar to the second zone stamp. At 608, a server in the plurality of servers can be selected to perform the stamp comparing and the zone delta-compressing based on the generated listing.

In some implementations, the current subject matter can include one or more of the following optional features. The method can further include deleting at least one of the first zone stamp and the second zone stamp from the generated listing. The deleted zone stamps can represent at least one zone purged from the plurality of zones. Additionally, the zone stamps associated with zones that were delta-compressed (which are not now and never will be anchors) can be purged form the stamp table. Purging these entries from the stamp table can help accelerate future stamp matches.

In some implementations, the logical arrangement of the plurality of zone stamps can be based on at least one of the following: a processing capability of each server in the plurality of servers, a size of each zone in the plurality of zones, a time consumed by the comparing, and availability of each server in the plurality of servers.

In some implementations, the comparing can include comparing the first zone stamp and the second zone stamp based on the first zone and the second zone having at least one of the following: same starting characters and same ending characters.

In some implementations, the delta-compressing can include delta-compressing the first zone and the second zone at at least one of the following: a first server in the plurality of servers storing the first zone and a second server in the plurality of servers storing the second zone. The delta-compressing can also include determining that a portion of the first zone is stored on a first server in the plurality of servers and another portion of the first zone is stored on a second server in the plurality of servers; and delta-compressing the first zone using the first server or the second server.

In some implementations, the selecting can include determining that a portion of the first zone is stored on a first server in the plurality of servers and another portion of the first zone is stored on a second server in the plurality of servers; and selecting the first server or the second server to perform the comparing and the delta-compressing.

In some implementations, the method can also include storing a delta-compressed zone at a server in a plurality of servers that received the un-delta-compressed zone in the data stream. Additionally, the method can include deduplicating, based on delta-compressing, the first zone and the second zone.

In some implementations, each delta-compressed zone can be associated with an anchor, wherein a plurality of delta-compressed zones can be dependent on the anchor, the delta-compressed zone is stored at a server in the plurality of servers storing the anchor. The selecting can include selecting a server in the plurality of servers to perform the comparing and the delta-compressing, where the selected server can store the anchor.

In some implementations, the method can further include removing a zone stamp from the generated listing, wherein the zone stamp represents an anchor delta-compressed zone having at least one dependent delta-compressed zone. Further, the method can include performing at least one of the comparing, the delta-compressing, and the selecting by the plurality of servers in parallel.

In some implementations, each zone can have a fixed and/or variable length.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising generating a listing of a plurality of zone stamps, each zone stamp representing a data zone in the plurality of data zones in a data stream, the data stream being received from at least one data source by a network of communicatively coupled plurality of grid servers, each grid server in the plurality of grid servers storing a grid server listing of zone stamps corresponding to zones of data stored on that grid server, the generated listing including a logical arrangement of a combination of grid server listings of zone stamps obtained from each grid server in the plurality of grid servers and being accessible by the plurality of grid servers, and storing the generated listing on a coordinating grid server in the plurality of grid servers;

partitioning, using the coordinating grid server, the generated listing into a plurality of partitions of zone stamps, each partition in the plurality of partitions including a portion of the plurality of zone stamps, the partitioning being performed based on at least one of the following: a processing capability of each grid server in the plurality of grid servers, a size of each zone in the plurality of zones stored by the plurality of grid servers, a time consumed by comparing of zone stamps in the plurality of zone stamps contained in the generated listing, availability to process data zones in the data stream of each grid server in the plurality of grid servers, and any combination thereof; and distributing, using the coordinating grid server, each partition of zone stamps in the plurality of partitions to one or more grid servers in the plurality of grid servers for storage, the distributing being performed based on at least a processing capability of each grid server in the plurality of grid servers;

selecting, using the coordinating grid server, a grid server in the plurality of grid servers, based on the generated listing and a partition stored on that grid server, to perform comparing a first zone stamp in the plurality of zone stamps contained in the generated listing to a second zone stamp in the plurality of zone stamps contained in the generated listing, the first zone stamp representing a first zone in the plurality of zones and the second zone stamp representing a second zone in the plurality of zones in the received data stream; and delta-compressing the first zone and the second zone based on a determination that the first zone stamp is substantially similar to the second zone stamp; and monitoring, using the coordinating grid server, the comparing and the delta-compressing, and, based on the monitoring, selecting, using the coordinating grid server, at least another grid server in the plurality of grid servers to perform the comparing and the delta-compressing upon determination that the selected grid server exceeded a predetermined amount of time to perform the comparing and the delta-compressing.

2. The method according to claim 1, further comprising deleting at least one of the first zone stamp and the second zone stamp from the generated listing.

3. The method according to claim 2, wherein the deleted at least one first zone stamp and the second zone stamp represent at least one zone purged from the plurality of zones.

4. The method according to claim 1, wherein the comparing further comprises comparing the first zone stamp and the second zone stamp based on the first zone and the second zone having at least one of the following: same starting characters and same ending characters.

5. The method according to claim 1, wherein the delta-compressing further comprises
delta-compressing the first zone and the second zone at at least one of the following: a first grid server in the plurality of grid servers storing the first zone and a second server in the plurality of servers storing the second zone.

6. The method according to claim 1, wherein the delta-compressing further comprises
determining that a portion of the first zone is stored on a first grid server in the plurality of grid servers and another portion of the first zone is stored on a second grid server in the plurality of grid servers; and
delta-compressing the first zone using the first grid server or the second grid server.

7. The method according to claim 1, wherein the selecting further comprises
determining that a portion of the first zone is stored on a first grid server in the plurality of grid servers and another portion of the first zone is stored on a second grid server in the plurality of grid servers; and
selecting, based on the determining, the first grid server or the second grid server to perform the comparing and the delta-compressing.

8. The method according to claim 1, further comprising storing a delta-compressed zone at a grid server in a plurality of grid servers that received the un-delta-compressed zone in the data stream.

9. The method according to claim 1, further comprising deduplicating, based on delta-compressing, the first zone and the second zone.

10. The method according to claim 1, wherein each delta-compressed zone is associated with an anchor, wherein a plurality of delta-compressed zones are dependent on the anchor, the delta-compressed zone is stored at a grid server in the plurality of grid servers storing the anchor.

11. The method according to claim 10, wherein the selecting further comprises
selecting a grid server in the plurality of servers to perform the comparing and the delta-compressing, the selected grid server storing the anchor.

12. The method according to claim 1, further comprising removing a zone stamp from the generated listing, wherein the zone stamp represents an anchor delta-compressed zone having at least one dependent delta-compressed zone.

13. The method according to claim 1, further comprising performing at least one of the comparing, the delta-compressing, and the selecting by the plurality of grid servers in parallel.

14. The method according to claim 1, wherein each zone has a fixed length.

15. The method according to claim 1, wherein each zone has a variable length.

16. A system comprising:
at least one programmable processor; and
a non-transitory machine-readable medium storing instructions that, when executed by the at least one programmable processor, cause the at least one programmable processor to perform operations comprising:
generating a listing of a plurality of zone stamps, each zone stamp representing a data zone in the plurality of data zones in a data stream, the data stream being received from at least one data source by a network of communicatively coupled plurality of grid servers, each grid server in the plurality of grid servers storing a grid server listing of zone stamps corresponding to zones of data stored on that grid server, the generated listing including a logical arrangement of a combination of grid server listings of zone stamps obtained from each grid server in the plurality of grid servers and being accessible by the plurality of grid servers;
partitioning, using the coordinating grid server, the generated listing into a plurality of partitions of zone stamps, each partition in the plurality of partitions including a portion of the plurality of zone stamps, the partitioning being performed based on at least one of the following: a processing capability of each grid server in the plurality of grid servers, a size of each zone in the plurality of zones stored by the plurality of grid servers, a time consumed by comparing of zone stamps in the plurality of zone stamps contained in the generated listing, availability to process data zones in the data stream of each grid server in the plurality of grid servers, and any combination thereof; and
distributing, using the coordinating grid server, each partition of zone stamps in the plurality of partitions to one or more grid servers in the plurality of grid servers for storage, the distributing being performed based on at least a processing capability of each grid server in the plurality of grid servers;
selecting, using the coordinating grid server, a grid server in the plurality of grid servers, based on the generated listing and a partition stored on that grid server, to perform
comparing a first zone stamp in the plurality of zone stamps contained in the generated listing to a second zone stamp in the plurality of zone stamps contained in the generated listing, the first zone stamp representing a first zone in the plurality of zones and the second zone stamp representing a second zone in the plurality of zones in the received data stream; and
delta-compressing the first zone and the second zone based on a determination that the first zone stamp is substantially similar to the second zone stamp; and
monitoring, using the coordinating grid server, the comparing and the delta-compressing, and, based on the monitoring, selecting, using the coordinating grid server, at least another grid server in the plurality of grid servers to perform the comparing and the delta-compressing upon determination that the selected grid server exceeded a predetermined amount of time to perform the comparing and the delta-compressing.

17. The system according to claim 16, wherein the operations further comprise deleting at least one of the first zone stamp and the second zone stamp from the generated listing.

18. The system according to claim 17, wherein the deleted at least one first zone stamp and the second zone stamp represent at least one zone purged from the plurality of zones.

19. The system according to claim 16, wherein the comparing further comprises comparing the first zone stamp and the second zone stamp based on the first zone and the second zone having at least one of the following: same starting characters and same ending characters.

20. The system according to claim 16, wherein the delta-compressing further comprises
delta-compressing the first zone and the second zone at at least one of the following: a first grid server in the plurality of grid servers storing the first zone and a second grid server in the plurality of grid servers storing the second zone.

21. The system according to claim 16, wherein the delta-compressing further comprises
determining that a portion of the first zone is stored on a first grid server in the plurality of grid servers and another portion of the first zone is stored on a second grid server in the plurality of grid servers; and
delta-compressing the first zone using the first grid server or the second grid server.

22. The system according to claim 16, wherein the selecting further comprises
determining that a portion of the first zone is stored on a first grid server in the plurality of grid servers and another portion of the first zone is stored on a second grid server in the plurality of grid servers; and
selecting, based on the determining, the first grid server or the second grid server to perform the comparing and the delta-compressing.

23. The system according to claim 16, wherein the operations further comprise
storing a delta-compressed zone at a grid server in a plurality of servers that received the un-delta-compressed zone in the data stream.

24. The system according to claim 16, wherein the operations further comprise deduplicating, based on delta-compressing, the first zone and the second zone.

25. The system according to claim 16, wherein each delta-compressed zone is associated with an anchor, wherein a plurality of delta-compressed zones are dependent on the anchor, the delta-compressed zone is stored at a grid server in the plurality of grid server s storing the anchor.

26. The system according to claim 16, wherein the selecting further comprises
selecting a grid server in the plurality of grid servers to perform the comparing and the delta-compressing, the selected grid server storing the anchor.

27. The system according to claim 26, wherein the operations further comprise
removing a zone stamp from the generated listing, wherein the zone stamp represents an anchor delta-compressed zone having at least one dependent delta-compressed zone.

28. The system according to claim 16, wherein the operations further comprise
performing at least one of the comparing, the delta-compressing, and the selecting by the plurality of grid servers in parallel.

29. The system according to claim 16, wherein each zone has a fixed length.

30. The system according to claim 16, wherein each zone has a variable length.

31. A computer program product comprising a non-transitory machine-readable medium storing instructions that, when executed by at least one programmable processor, cause the at least one programmable processor to perform operations comprising:

generating a listing of a plurality of zone stamps, each zone stamp representing a data zone in the plurality of data zones in a data stream, the data stream being received from at least one data source by a network of communicatively coupled plurality of grid servers, each grid server in the plurality of grid servers storing a grid server listing of zone stamps corresponding to zones of data stored on that grid server, the generated listing including a logical arrangement of a combination of grid server listings of zone stamps obtained from each grid server in the plurality of grid servers and being accessible by the plurality of grid servers, and storing the generated listing on a coordinating grid server in the plurality of grid servers;

partitioning, using the coordinating grid server, the generated listing into a plurality of partitions of zone stamps, each partition in the plurality of partitions including a portion of the plurality of zone stamps, the partitioning being performed based on at least one of the following: a processing capability of each grid server in the plurality of grid servers, a size of each zone in the plurality of zones stored by the plurality of grid servers, a time consumed by comparing of zone stamps in the plurality of zone stamps contained in the generated listing, availability to process data zones in the data stream of each grid server in the plurality of grid servers, and any combination thereof; and distributing, using the coordinating grid server, each partition of zone stamps in the plurality of partitions to one or more grid servers in the plurality of grid servers for storage, the distributing being performed based on at least a processing capability of each grid server in the plurality of grid servers;

selecting, using the coordinating grid server, a grid server in the plurality of grid servers, based on the generated listing and a partition stored on that grid server, to perform
comparing a first zone stamp in the plurality of zone stamps contained in the generated listing to a second zone stamp in the plurality of zone stamps contained in the generated listing, the first zone stamp representing a first zone in the plurality of zones and the second zone stamp representing a second zone in the plurality of zones in the received data stream; and
delta-compressing the first zone and the second zone based on a determination that the first zone stamp is substantially similar to the second zone stamp; and monitoring, using the coordinating grid server, the comparing and the delta-compressing, and, based on the monitoring, selecting, using the coordinating grid server, at least another grid server in the plurality of grid servers to perform the comparing and the delta-compressing upon determination that the selected grid server exceeded a predetermined amount of time to perform the comparing and the delta-compressing.

32. The computer program product according to claim 31, wherein the operations further comprise deleting at least one of the first zone stamp and the second zone stamp from the generated listing.

33. The computer program product according to claim 32, wherein the deleted at least one first zone stamp and the second zone stamp represent at least one zone purged from the plurality of zones.

34. The computer program product according to claim 31, wherein the comparing further comprises comparing the first zone stamp and the second zone stamp based on the first zone and the second zone having at least one of the following: same starting characters and same ending characters.

35. The computer program product according to claim 31, wherein the delta-compressing further comprises
delta-compressing the first zone and the second zone at at least one of the following: a first grid server in the plurality of grid servers storing the first zone and a second grid server in the plurality of grid servers storing the second zone.

36. The computer program product according to claim 31, wherein the delta-compressing further comprises
determining that a portion of the first zone is stored on a first grid server in the plurality of grid servers and another portion of the first zone is stored on a second grid server in the plurality of grid servers; and
delta-compressing the first zone using the first grid server or the second grid server.

37. The computer program product according to claim 31, wherein the selecting further comprises
determining that a portion of the first zone is stored on a first grid server in the plurality of grid servers and another portion of the first zone is stored on a second grid server in the plurality of grid servers; and
selecting, based on the determining, the first grid server or the second grid server to perform the comparing and the delta-compressing.

38. The computer program product according to claim 31, wherein the operations further comprise
storing a delta-compressed zone at a grid server in a plurality of grid servers that received the un-delta-compressed zone in the data stream.

39. The computer program product according to claim 31, wherein the operations further comprise
deduplicating, based on delta-compressing, the first zone and the second zone.

40. The computer program product according to claim 31, wherein each delta-compressed zone is associated with an anchor, wherein a plurality of delta-compressed zones are dependent on the anchor, the delta-compressed zone is stored at a grid server in the plurality of grid servers storing the anchor.

41. The computer program product according to claim 31, wherein the selecting further comprises
selecting a grid server in the plurality of grid servers to perform the comparing and the delta-compressing, the selected grid server storing the anchor.

42. The computer program product according to claim 41, wherein the operations further comprise
removing a zone stamp from the generated listing, wherein the zone stamp represents an anchor delta-compressed zone having at least one dependent delta-compressed zone.

43. The computer program product according to claim 31, wherein the operations further comprise
performing at least one of the comparing, the delta-compressing, and the selecting by the plurality of grid servers in parallel.

44. The computer program product according to claim 31, wherein each zone has a fixed length.

45. The computer program product according to claim 31, wherein each zone has a variable length.

* * * * *